(12) United States Patent
Chen et al.

(10) Patent No.: US 9,738,808 B2
(45) Date of Patent: Aug. 22, 2017

(54) THERMAL INKJET INK SET

(71) Applicant: Hewlett-Packard Development Company, L.P., Houston, TX (US)

(72) Inventors: Tienteh Chen, San Diego, CA (US); Elizabeth Ann Visnyak, San Diego, CA (US); Keshava A. Prasad, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/107,908

(22) PCT Filed: Jan. 28, 2014

(86) PCT No.: PCT/US2014/013339
§ 371 (c)(1),
(2) Date: Jun. 23, 2016

(87) PCT Pub. No.: WO2015/116029
PCT Pub. Date: Aug. 6, 2015

(65) Prior Publication Data
US 2016/0319147 A1    Nov. 3, 2016

(51) Int. Cl.
*B41J 2/015* (2006.01)
*G01D 11/00* (2006.01)
(Continued)

(52) U.S. Cl.
CPC ........... *C09D 11/54* (2013.01); *B41J 11/0015* (2013.01); *C09D 11/10* (2013.01); *C09D 11/107* (2013.01);
(Continued)

(58) Field of Classification Search
CPC ....... C09D 11/322; C09D 11/54; C09D 11/40; C09D 11/30; C09D 11/326; C09D 11/037;
(Continued)

(56) References Cited

U.S. PATENT DOCUMENTS 5,137,961 A    8/1992    Goos et al.
5,312,865 A    5/1994    Hoefer et al.
(Continued)

FOREIGN PATENT DOCUMENTS

JP    2004330568    11/2004

OTHER PUBLICATIONS

International Search Report and Written Opinion for International Application No. PCT/US2014/013339 dated Oct. 27, 2014, 11 pages.

*Primary Examiner* — Jannelle M Lebron
(74) *Attorney, Agent, or Firm* — HP Inc. Patent Department (57) ABSTRACT

A thermal inkjet ink set includes a pre-treatment fixing fluid, an ink, and a post-treatment fluid. The pre-treatment fixing fluid includes a metal salt. The ink includes an ink vehicle and a colorant. The post-treatment fluid includes a fluid vehicle and an anionic polyurethane acrylic hybrid polymer binder dispersed in the fluid vehicle. The anionic polyurethane acrylic hybrid polymer binder is present in an amount ranging from greater than 0 wt % to about 25 wt %. The anionic polyurethane acrylic hybrid polymer binder includes an acrylic polymer or copolymer, and an anionic polyurethane polymer encapsulating the acrylic polymer or copolymer.

12 Claims, 1 Drawing Sheet (51) Int. Cl.
*C09D 11/54* (2014.01)
*C09D 11/40* (2014.01)
*C09D 11/10* (2014.01)
*C09D 11/322* (2014.01)
*B41J 11/00* (2006.01)
*C09D 11/107* (2014.01)
*B41M 5/00* (2006.01)
*B41M 7/00* (2006.01)

(52) U.S. Cl.
CPC ............ *C09D 11/322* (2013.01); *C09D 11/40* (2013.01); *B41M 5/0017* (2013.01); *B41M 7/0036* (2013.01)

(58) Field of Classification Search
CPC ..... C09D 11/107; C09D 11/10; C09D 11/328; C09D 11/32; C09D 11/00; C09D 11/02; C09D 11/005; B41J 11/0015; B41J 2/2114; B41J 2/01; B41M 5/0017; B41M 5/0047; B41M 7/0036
USPC .......................................... 347/21, 100, 102
See application file for complete search history.

(56) References Cited

U.S. PATENT DOCUMENTS

| | | |
|---|---|---|
| 6,270,214 B1 | 8/2001 | Smith et al. |
| 6,932,466 B2 | 8/2005 | Payne et al. |
| 8,012,551 B2 | 9/2011 | Song et al. |
| 8,455,570 B2 | 6/2013 | Lindstrom et al. |
| 8,556,402 B2 | 10/2013 | Li |
| 2005/0191444 A1 | 9/2005 | Campbell et al. |
| 2005/0243121 A1 | 11/2005 | Onishi |
| 2009/0020036 A1 | 1/2009 | Ganapathiappan |
| 2009/0035468 A1 | 2/2009 | Matsuyama et al. |
| 2009/0304925 A1 | 12/2009 | Berge et al. |
| 2012/0270992 A1 | 10/2012 | Larock et al. |
| 2012/0306976 A1 | 12/2012 | Kitagawa et al. |
| 2013/0201252 A1 | 8/2013 | Namba |

THERMAL INKJET INK SET

BACKGROUND

Inkjet printing is a popular printing technique for recording images on a variety of media, including plain paper and photo paper. Inkjet printers typically form ink droplets using heat or mechanical vibration. As an example, thermal inkjet printers include resistors that create heat, which vaporizes ink in an ink nozzle on a cartridge to create a bubble. As the bubble expands, some of the ink is pushed out of the ink nozzle and onto the desired medium. The ink used may include a colorant and some combination of ingredients to achieve desired print quality and/or printer performance.

BRIEF DESCRIPTION OF THE DRAWING

Features and advantages of examples of the present disclosure will become apparent by reference to the following detailed description and drawing.

DETAILED DESCRIPTION

Some thermal inkjet inks include a durability resin (e.g., a polymeric binder) in order to improve the durability of printed images formed with these inks. Examples of the durability resin include a polymer latex (which is a polymer particle formed synthetically by emulsion polymerization), polyurethane dispersions, acrylic dispersions, and polyester dispersions. However, it has been found that the amount and type of durability resin that can be used in these inks may be limited when the inks also include a pigment in the ink vehicle. The nature and/or amount of the durability resin, the nature and/or amount of the pigment, and the ink vehicle itself can all affect the jetting reliability of the printing system due, at least in part, to printer cartridge design and/or its thermal effects. It has been found that inks including any of the previously listed polymeric binders so not simultaneously provide good jetting reliability, fast drying, and enhanced durability.

Figure 1:
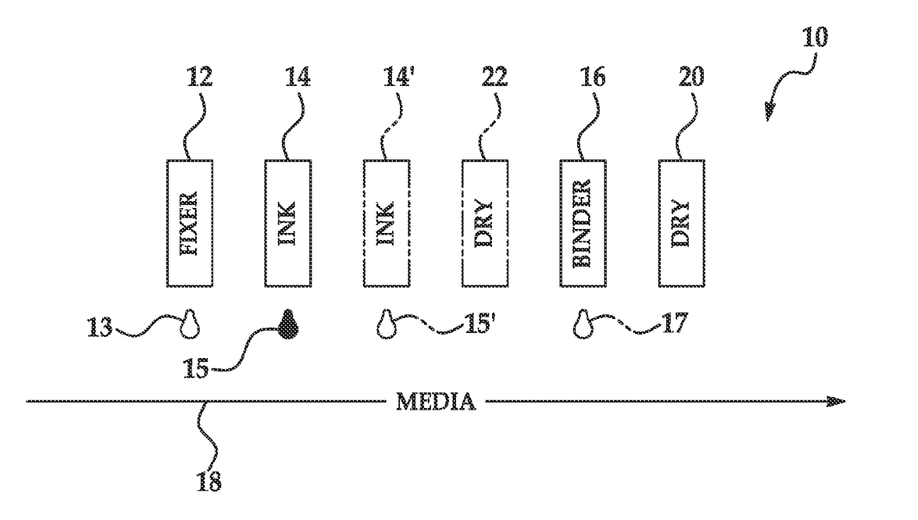
FIG. 1 is a flow diagram illustrating an example of a printing method using an example of an ink set disclosed herein.

Examples of the ink set disclosed herein advantageously separate specific compositional elements into different fluids of a multiple-cartridge ink set. The multiple-cartridge ink set is used in a printing method 10, which is schematically shown in FIG. 1 and will be described further hereinbelow. As illustrated in FIG. 1, the multiple-cartridge ink set includes a pre-treatment fixing fluid 13, "Fixer" contained in one cartridge 12, an ink 15, "Ink" contained in another cartridge 14, and a post-treatment fluid 17, "Binder" contained in still another cartridge 16. The pre-treatment fixing fluid 13 may include a metal salt, the ink 15 may include an ink vehicle and a colorant, and the post-treatment fluid 17 may include a polymeric binder. In the examples disclosed herein, the pre-treatment fixing fluid 13 may be devoid of colorant and polymeric binder, the ink 15 may be devoid of metal salt and polymeric binder, and the post-treatment fluid 17 may be devoid of colorant and metal salt.

As used herein, the term "devoid of" when referring to a component (such as, e.g., a metal salt, a colorant, a polymeric binder, etc.) refers to a composition that does not include any purposefully added amount of the component, but may contain residual amounts, for example, in the form of impurities. As one example, metal salts may inherently be present in residual or trace amounts in water or other vehicle components, and those concentrations may be present in the composition, provided they do not unfavorably interact with colorant or other ingredients. The components may be present in trace amounts, and in one aspect, in an amount of less than 0.1 weight percent (wt %) based on the total wt % of the composition (e.g., pre-treatment fluid 13, ink 15, or post-treatment fluid 17), even though the composition is described as being "devoid of" the component. In other words, "devoid of" a component may mean free of a purposefully added component but allows for trace amounts or impurities of that component that may be inherently present in certain ingredients.

By decoupling compositional elements (e.g., the pigments and the polymeric binder), it has been found that there is greater flexibility with regard to the composition and amount of the polymeric binder that can be used in the post-treatment fluid 17 disclosed herein. Regarding the composition of the polymeric binder, it has been found that a hybrid polymeric binder consisting of an acrylic polymer or copolymer and an anionic polyurethane polymer exhibits superior performance when compared to polymer latex and other polymeric binders. Regarding the amount of the polymeric binder, it has been found that the hybrid polymeric binder disclosed herein may be present in amounts up to 25 wt % of the total wt % of the post-treatment fluid 17 without deleteriously affecting printer reliability. The relatively large amounts contribute to the image durability.

In addition, reduced dry times (e.g., less than 10 seconds) may be used without deleteriously affecting image durability. It is believed that this is due to the ability of the hybrid polymeric binder disclosed herein to rapidly crosslink. This is especially desirable for high speed printing applications.

As mentioned above, the multiple-cartridge ink set includes the pre-treatment fixing fluid 13, which is used to control and minimize ink bleed and coalescence on various types of media 18 (e.g., coated paper, offset media, etc.). The pre-treatment fixing fluid 13 also contributes to enhanced optical density, saturation, and/or text print quality.

The composition of the pre-treatment fixing fluid 13 may include a metal salt. The metal salt may flocculate pigment in the ink and control pigment migration. In some examples, the polyvalent metal salt component may be soluble in water.

The metal salt may include a polyvalent metal cation. Examples of suitable divalent metal cations include $Ca^{2+}$, $Cu^{2+}$, $Ni^{2+}$, $Mg^{2+}$, $Zn^{2+}$, or a combination thereof. Examples of suitable trivalent metal cations include $Al^{3+}$, $Fe^{3+}$, or a combination thereof. Since $Cu^{2+}$, $Ni^{2+}$, and $Fe^{3+}$ are colored, these cations may be less desirable or may be desirable for a particular printing application. In one example, the polyvalent metal cation may be $Ca^{2+}$. The metal salts may also include anions, examples of which include $Cl^-$, $I^-$, $Br^-$, $NO^{3-}$ or $RCOO^-$, where R is H or any straight or branched hydrocarbon chain including from 1 to 8 carbon atoms. In one example, the polyvalent metal anion may be a chloride ($Cl^-$) or an acetate ($CH_3COO^-$).

In other examples, the polyvalent metal salt may be composed of divalent or polyvalent metallic ions and of nitrate or carboxylate ions. The carboxylate ions may be derived from pantothenic acid, or a saturated aliphatic monocarboxylic acid having 1 to 6 carbon atoms, or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid.

Some specific examples of the polyvalent metal salt include calcium propionate, calcium pantothenate, calcium chloride, calcium nitrate, magnesium nitrate, magnesium acetate, zinc acetate, or combinations thereof. In some other examples, the polyvalent metal salt may be a combination of calcium propionate and calcium pantothenate.

The metal salt may be included in the pre-treatment fixing fluid 13 at a concentration suitable for fixing pigment in the ink 15. In an example, the metal salt may be present in an amount ranging from about 3 wt % to about 10 wt %. In an example, the pre-treatment fixing fluid 13 may include calcium propionate in an amount ranging from about 3 wt % to about 8 wt % and calcium pantothenate in an amount ranging from about 2 wt % to about 5 wt %. In another example, the pre-treatment fixing fluid 13 may include about 6.5 wt % of calcium propionate and about 4.8 wt % of calcium pantothenate. While a few examples have been given herein, it is to be understood that other combinations and amounts of the metal salt(s) may be possible within the scope of the present disclosure.

The pre-treatment fixing fluid 13 may also include a mixture of a variety of different additives. Examples of these additives may include co-solvents, buffers, surfactants, antimicrobial agents, viscosity modifiers, sequestering agents, preservatives, and the like. The balance of the pre-treatment fixing fluid 13 is water.

The pre-treatment fixing fluid 13 may include a co-solvent present in total in the pre-treatment fixing fluid in a range from about 0.1 wt % to about 30 wt %, depending, at least in part on the jetting architecture. In some examples, amounts outside of this range may also be used. Classes of co-solvents that can be used include organic co-solvents such as diols, triols, glycol ethers, polyglycol ethers, caprolactams, formamides, acetamides, and long chain alcohols. Examples of such co-solvents include 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. As an example, the pre-treatment fixing fluid may include tetraethylene glycol.

Non-ionic, cationic, and/or anionic surfactants may be present in total in the pre-treatment fixing fluid 13 in a range from about 0.01 wt % to about 5 wt %. In at least some implementations, the pre-treatment fixing fluid 13 may include a self-emulsifiable wetting agent based on acetylenic diol chemistry (e.g., SURFYNOL® SE-F surfactant from Air Products and Chemicals, Inc.).

Antimicrobial agents, such as biocides and fungicides, may be added to inhibit the growth of harmful microorganisms. Example antimicrobial agents may include the NUOSEPT® (Ashland Inc.), UCARCIDE™ or KORDEK™ (Dow Chemical Co.), and PROXEL® (Arch Chemicals) series, and combinations thereof. A total amount of the antimicrobial agents in the pre-treatment fixing fluid 13 may range from about 0.05 wt % to about 1 wt %. In an example, the pre-treatment fixing fluid 13 includes about 0.1 wt % of a biocide.

Even when the pre-treatment fixing fluid 13 includes one or more of the above-mentioned additives, water may be the predominant ingredient. Buffers may be used to adjust the pH of the pre-treatment fixing fluid 13 to a particular pH. One example of a suitable buffer is methanesulfonic acid. In some examples, the buffer may be used in an amount sufficient to buffer the pH of the pre-treatment fixing fluid 13 so that it ranges from 4.0 to 7.0. In an example, the pH of the pre-treatment fixing fluid 13 is adjusted to about 6.6 using methanesulfonic acid.

The multiple-cartridge ink set includes the ink 15 (or multiple inks 15, 15'), which is/are used for image creation. The ink 15 may be any color, such as black, cyan, magenta, yellow, etc. The ink generally includes an ink vehicle and a colorant.

As used herein, "ink vehicle" may refer to the liquid fluid in which colorant is placed to form the ink 15. A wide variety of ink vehicles may be used with the ink sets and methods of the present disclosure. The ink vehicle may include water alone or in combination with a mixture of a variety of different agents. Examples of these agents may include, but are limited to, co-solvents, surfactants, antimicrobial agents, anti-kogation agents, viscosity modifiers, materials for pH adjustment, sequestering agents, preservatives, and the like.

The ink vehicle may include a co-solvent present in total in the ink 15 in an amount ranging from about 0.1 wt % to about 30 wt %, depending, at least in part, on the jetting architecture. In an example, the co-solvent in present in the ink 15 in an amount of about 6 wt % based on the total wt % of the ink 15. It is to be understood that other amounts outside of this example and range may also be used. Classes of co-solvents that can be used can include organic co-solvents, such as aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle may also include surfactant(s) and/or antimicrobial agent(s). As an example, the ink 15 may include non-ionic, cationic, and/or anionic surfactants, which may be present in an amount ranging from about 0.01 wt % to about 5 wt % based on the total wt % of the ink 15. In at least some examples, the ink vehicle may include a silicone-free alkoxylated alcohol surfactant such as, for example, TEGO® Wet 510 (Evonik Tego Chemie GmbH). Suitable antimicrobial agents include biocides and fungicides, including those previously described for use in the pre-treatment fixing fluid 13. In an example, the ink 15 may include a total amount of antimicrobial agents that ranges from about 0.1 wt % to about 0.25 wt %.

An anti-kogation agent may also be included in the ink 15. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. The anti-kogation agent may be present in the ink 15 in an amount ranging from about 0.1 wt % to about 2 wt % of the total wt % of the ink 15.

In addition to the ink vehicle, the ink also includes a colorant. In an example, the colorant is an anionically dispersed pigment. In an example, the anionically dispersed pigment is a dispersion including water, the pigment, and an anionic polymer that disperses the pigment. The dispersion may also include, for example, a co-solvent, such as 2-pyrrolidone.

The pigment may be any suitable organic and/or inorganic pigment. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

The total amount of pigment in the ink 15 ranges from about 1 wt % to about 5 wt % (based on the total wt % of the ink 15). The average particle size of the pigments may range anywhere from about 80 nm to about 150 nm.

In the examples disclosed herein, the pigment is dispersed by the anionic polymer (i.e., dispersant). The dispersant may be present in an amount ranging from about 0.1 wt % to about 5 wt % of a total wt % of the ink 15.

In an example, the dispersant may be styrene-acrylic-type dispersants such as, acrylic dispersants having i) hydrophilic monomers including acidic monomers, and ii) hydrophobic monomers. The acid number of the dispersant may range from about 120 mg/g to about 300 mg/g.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

It is to be understood that the multiple-cartridge ink set may include a plurality of inks 15, 15', each with an ink vehicle and colorant as described herein and devoid of metal salt.

The multiple-cartridge ink set also includes the post-treatment fluid 17. The post-treatment fluid 17 includes a fluid vehicle and the anionic polyurethane acrylic hybrid polymer binder dispersed in the fluid vehicle.

As used herein, "fluid vehicle" may refer to the liquid fluid in which the anionic polyurethane acrylic hybrid polymer binder is placed to form the post-treatment fluid 17. The fluid vehicle may include water, alone or in combination with a mixture of a variety of different agents. Examples of these agents may include, but are limited to, co-solvents, surfactants, antimicrobial agents, anti-kogation agents, wax(es), and the like.

The fluid vehicle may include a co-solvent present in total in the post-treatment fluid 17 in an amount ranging from about 1 wt % to about 30 wt %, depending, at least in part, on the jetting architecture. In an example, the total amount of co-solvent(s) present in the post-treatment fluid 17 is about 11.5 wt % based on the total wt % of the post-treatment fluid 17. It is to be understood that other amounts outside of this example and range may also be used. Some examples of suitable co-solvents for the fluid vehicle include Di-(2-Hydroxyethyl)-5,5-Dimethylhydantoin (such as, e.g., DANTOCOL™ DHE, from Lonza Inc.), N-(2-Hydroxyethyl)-2-pyrrolidone, hydroxyethyl urea, 1,2,6-hexanetriol, 1,2,4-hexanetriol, tetraethylene glycol, 2-methyl-2-hydroxymethyl-1,3-propandiol, and combinations thereof.

As mentioned above, the fluid vehicle may also include surfactant(s) and/or antimicrobial agent(s). As an example, the ink may include non-ionic, cationic, and/or anionic surfactants, which may be present in a total amount ranging from about 0.01 wt % to about 5 wt % based on the total wt % of the post-treatment fluid 17. In at least some examples, the fluid vehicle may include a combination of surfactants, such as a combination of a self-emulsifiable surfactant based on acetylenic diol chemistry (e.g., SURFYNOL® SE-F surfactant, Air Products and Chemicals, Inc.) and an anionic surfactant (such as, e.g., DOWFAX™ 8390, Dow Chemical Co.). Suitable antimicrobial agents for the post-treatment fluid include those previously described for use in the pre-treatment fixing fluid 13 and the ink 15. In an example, the post-treatment fluid 17 may include a total amount of antimicrobial agents that ranges from about 0.1 wt % to about 0.25 wt %.

Any of the previously mentioned anti-kogation agents may be used in the fluid vehicle of the post-treatment fluid 17. Other suitable examples include chelators, such as ethylene diamine tetraacetic acid (EDTA), diethylene triamine pentaacetic acid (DTPA), or 2-hydroxyethyliminodiacetic acid (EDG). The total amount of anti-kogation agent ranges from about 0.1 wt % to about 2 wt % of the total wt % of the post-treatment fluid 17.

The post-treatment fluid 17 may also include a wax. Example of suitable waxes include UNITHOX™ ethoxylates (available from Baker Hughes Inc.), such as UNITHOX™ 420, UNITHOX™ 450, and UNITHOX™ 480. The total amount of wax may range from about 0.1 wt % to about 2 wt % of the total wt % of the post-treatment fluid 17.

The amount of the anionic polyurethane acrylic hybrid polymer binder that may be included in the post-treatment fluid 17 may be higher than the amount in comparative inkjet inks which also include a colorant. For example, the anionic polyurethane acrylic hybrid polymer binder may be present in the post-treatment fluid 17 in an amount of at least 10 wt %. In the examples disclosed herein, the amount of the anionic polyurethane acrylic hybrid polymer binder generally ranges from greater than 0 wt % to about 25 wt %. It is believed that the unique core-shell morphology of the polyurethane acrylic hybrid polymer binder unexpectedly enables the higher loads of the polymer binder to be used without compromising good jetting ability. The higher loads also improve the durability of the resulting prints.

In the examples disclosed herein, the anionic polyurethane acrylic hybrid polymer binder includes an acrylic polymer or copolymer and an anionic polyurethane polymer that encapsulates the acrylic polymer or copolymer. As such, the acrylic polymer or copolymer may be the core, and the anionic polyurethane polymer may be the shell. The anionic polyurethane acrylic hybrid polymer binder includes 50 wt % or more of the acrylic polymer or copolymer and 50 wt % or less of the anionic polyurethane polymer. In an example, the anionic polyurethane acrylic hybrid polymer binder includes 70 wt % or more of the acrylic polymer or copolymer and 30 wt % or less of the anionic polyurethane polymer. In still another example, the anionic polyurethane acrylic hybrid polymer binder includes from about 70 wt % to about 90 wt % of the acrylic polymer or copolymer and from about 10 wt % to about 30 wt % of the anionic polyurethane polymer. It is believed that the anionic polyurethane acrylic hybrid polymer binder having a higher acrylic polymer/copolymer to polyurethane polymer ratio results in a post-treatment fluid 17 that exhibits better decap performance and has less of an impact on crusting (i.e., time that inkjet pen can be continuously operated without servicing).

The anionic polyurethane acrylic hybrid polymer binder may be prepared using a three step process. The first step involves the synthesis of a polyurethane solution (i.e., the polyurethane polymer in an organic solvent). The second step involves the ionization and dispersion of the polyurethane solution in water to form an anionic polyurethane dispersion. The anionic polyurethane dispersion includes the anionic polyurethane polymer, which is water soluble/dispersible. The third step involves the free radical emulsion polymerization of acrylic monomers in the presence of the anionic polyurethane dispersion formed in the second step. Each of these steps will be discussed further below.

The composition of the anionic polyurethane polymer includes the following components: (a) a polyisocyanate, (b) a polyol having a number average molecular weight ($M_n$) from about 500 to about 6,000, (c) a compound containing an ionic group or a group capable of forming an ionic group, (d) optionally a polyol having a polyethyleneoxide functional group, and (e) optionally a diol or triol having a number average molecular weight ($M_n$) ranging from about 62 to about 500. In an example, the anionic polyurethane polymer may have a weight average molecular weight ($M_w$) ranging from about 5,000 to about 70,000.

The amount of component (a) within the anionic polyurethane dispersion ranges from about 20 wt % to about 60 wt % based upon the total resin amount in the dispersion. In an example, component (a) ranges from about 30 wt % to about 50 wt %.

Component (a) may be any polyisocyanate typically used in polyurethane chemistry. Some suitable polyisocyanates have an average of about two or more isocyanate groups. In an example, the polyisocyanate includes an average of from about 2 to about 4 isocyanate groups per molecule and from about 5 to 20 carbon atoms (in addition to nitrogen, oxygen, and hydrogen). Component (a) may be an aliphatic, cycloaliphatic, araliphatic, or aromatic polyisocyanate, as well as products of their oligomerization, used alone or in mixtures of two or more.

Some specific examples of suitable aliphatic polyisocyanates include alpha, omega-alkylene diisocyanates having from 5 to 20 carbon atoms, such as hexamethylene-1,6-diiso-cyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, or the like. Polyisocyanates having fewer than 5 carbon atoms can also be used, but may be less desirable because of their relatively high volatility. In an example, the aliphatic polyisocyanate is selected from isophorone diisocyanate (IPDI), 2,2,4-trimethyl-hexamethylene-diisocyanate (TDMI), 2,4,4-trimethyl-hexamethylene diisocyanate, and hexamethylene diisocyanate (HDI).

Some specific examples of suitable cycloaliphatic polyisocyanates include dicyclohexylmethane diisocyanate (commercially available as DESMODUR™ W from Bayer Corp., isophorone diisocyanate, 1,4-cyclohexane diisocyanate, 1,3-bis-(isocyanatomethyl)cyclohexane, or the like. In an example, the cycloaliphatic polyisocyanate is selected from dicyclohexylmethane diisocyanate and isophorone diisocyanate.

Some specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, or the like. In an example, tetramethyl xylylene diisocyanate is selected.

Examples of suitable aromatic polyisocyanates include 4,4'-diphenylmethylene diisocyanate, toluene diisocyanate and its isomers, naphthalene diisocyanate and its oligomeric forms, or the like. In an example, toluene diisocyanate is selected.

The amount of component (b) within the anionic polyurethane dispersion ranges from about 10 wt % to about 50 wt % based upon the total resin amount in the dispersion. In an example, component (b) ranges from about 15 wt % to about 40 wt %.

Component (b) is a polyol. The term "polyol", as used herein, means any product having an average of about 2 or more hydroxyl groups per molecule. Examples of suitable polyols for component (b) have a number average molecular weight of at least 500. As examples, component (b) may have a number average molecular weight ranging from about 1,000 to about 10,000, or from about 1,000 to about 6,000 may be used. As other examples, component (b) may have a number average molecular weight ranging from about 500 to about 6,000. In any of these examples, component (b) is a macro-glycol. Examples of suitable macroglycols include polyester polyols (e.g., alkyds), polyether polyols, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters and polyethers, or the like, or mixtures thereof.

The amount of component (c) within the anionic polyurethane dispersion ranges from greater than 0 wt % to about 10 wt % based upon the total resin amount in the dispersion. In an example, component (c) ranges from about 2 wt % to about 5 wt %.

Component (c) is a low molecular weight compound which contains ionic group(s) or some group that is capable of forming an ionic group. Component (c) is desirable so that the polyurethane can be dissolved or dispersed in water after ionization with a base. Examples of component (c) may be derived from hydroxy-carboxylic acids having the general formula $(HO)_xQ(COOH)_y$, where Q is a straight or branched hydrocarbon radical containing 1 to 12 carbon atoms, and x and y each independently range from 1 to 3. Examples of suitable hydroxy-carboxylic acids include dimethylolpropionic acid (DMPA), dimethylol butanoic acid (DMBA), citric acid, tartaric acid, glycolic acid, lactic acid, malic acid, dihydroxymaleic acid, dihydroxytartaric acid, or the like, or mixtures thereof. Hydroxyls or amines containing a sulfonate functional group can also be used as component (c). Examples include taurine and aminopropylaminoethylsulfonate. Hydroxyls or amines containing a phosphate functional group can also be used as component (c). An example includes glycerol phosphate disodium dehydrate.

As noted above, component (d) is optional. When included, the amount of component (d) within the anionic polyurethane dispersion ranges from greater than 0 wt % to about 10 wt % based upon the total resin amount in the dispersion. In an example, component (d) ranges from about 2 wt % to about 8 wt %.

Component (d) is a polyol having a polyethyleneoxide functional group. In an example, component (d) also has a water solubility of >10% w/w. For component (d), the OH functionality ranges from at least 1.8 to 3, or in some examples from 1.9 to 2.2. The number average molecular weight ranges from about 500 to 2,000. An example of component (d) includes YMER™ N-120 (Perstop Chemical Company).

As noted above, component (e) is optional. When included, the amount of component (e) within the anionic polyurethane dispersion ranges from 1 wt % to about 10 wt % based upon the total resin amount in the dispersion. In an example, component (d) ranges from about 5 wt % to about 10 wt %.

Component (e) is a lower molecular weight diol or triol with a number average molecular weight ($M_n$) ranging from about 62 to about 500. In an example, component (e) has a number average molecular weight ($M_n$) ranging from about 62 to about 400 with the average number of functional groups ranging from 2 to 5. The diols are bifunctional alcohols which are typically used in polyurethane chemistry to control the hard segment and molecular weight. In some instances, they are referred to as chain extenders. Examples of component (e) include 1,2-propanediol, 1,3-propanediol, 1,2-butanediol, 1,3-butanediol, 1,4-butanediol, 1,5-pentanediol, 3-methylpentane-1,5-diol, 1,6-hexanediol, neopentyl glycol, cyclohexanel-1,4-dimethanol, 1,2-cyclohexanediol, 1,4-cyclohexanediol, 2-ethyl-3-propylpentanediol, 2,4-dimethylpentanediol, 2-ethyl-2-butylpropanediol, diethylene glycol, triethylene glycol, tetraethylene glycol, dipropylene glycol, tripropylene glycol, N-substituted ethanolamines, and mixtures of these products. In an example, the diol is selected from 1,4-butanediol, 1,5-pentanediol, 3-methylpentane-1,5-diol, 1,6-hexanediol, neopentyl glycol, and cyclohexane-1,4-dimethanol, trimethylolpropane, glycerol, and pentaerythritol.

Several examples of the composition of the anionic polyurethane polymer are shown in TABLE 1. The following abbreviations are used in TABLE 1: PTMG (Polytetrahydrofuran, MW 1000), PPG (Polypropyleneglycol, MW 1000), Kuraray C-1090 (Polycarbonate Polyol from Kuraray Chemical, MW 1000), MCR-C61 (Monodicarbinol terminated polydimethylsiloxane from Gelest, MW 1000), DMS-C15 (Carbinol (Hydroxyl) terminated polydimethylsiloxane by Gelest, MW 1000), CHDM (cyclohexane dimethyol), MPD (3-Methyl-1,5-Pentanediol from Kuraray), HEA (hydroxylethyl acrylate), YMER N-120 (Polyethyleneoxide Diol from Perstop Chemical), and DMPA (2,2'-Dimethyloyl Propionic Acid).

TABLE 1

Anionic Polyurethane Polymer Components

| ID | (a) isocyanate | (b) Polyol | (c) Ionic Group | (d) N-120 | (e) Diol or Triol | Acid No. | Mol. Weight ($M_W$) |
|---|---|---|---|---|---|---|---|
| PUD-1 | IPDI | PTMG | DMPA | none | none | 55 | High* |
| PUD-2 | IPDI | PTMG | DMPA | none | none | 65 | High |
| PUD-3 | IPDI | Kuraray C-1090 | DMPA | none | none | 55 | High |
| PUD-4 | IPDI | Kuraray C-1090 | DMPA | YMER N-120 | none | 16 | High |
| PUD-5 | IPDI | PPG | DMPA | none | none | 55 | High |
| PUD-6 | IPDI | PTMG | DMPA | none | none | 55 | Med** |
| PUD-10 | IPDI | Kuraray C-1090 | DMPA | YMER N-120 | none | 53 | High |
| PUD-11 | IPDI | Kuraray C-1090 | DMPA | YMER N-120 | none | 53.4 | High |
| PUD-12 | IPDI | Kuraray C-1090 | DMPA | none | none | 55 | Med |
| PUD-13 | IPDI | Kuraray C-1090 | DMPA | YMER N-120 | none | 53.4 | Med |
| PUD-15 | IPDI | PTMG | DMPA | none | none | 72 | High |
| PUD-16 | IPDI | PTMG | DMPA | none | CHDM | 55 | High |
| PUD-21 | IPDI | PTMG | DMPA | none | CHDM/HEA | 55 | High |
| PUD-22 | IPDI | PPG | DMPA/Taurine | none | MPD | 39 | High |
| PUD-23 | IPDI | PPG | DMPA/Taurine | none | MPD | 56 | High |
| PUD-24 | IPDI | PPG | DMPA | none | none | 55 | Med |
| PUD-31 | IPDI | PTMG | Taurine | YMER N-120 | MPD | 16.7 | High |
| PUD-37 | IPDI | PTMG/MCR-C61 | DMPA | none | none | 55 | High |
| PUD-39 | IPDI | PTMG/DMS-C15 | DMPA | none | none | 55 | High |
| PUD-44 | IPDI | PPG | Taurine | none | MPD | 69 | High |
| PUD-53 | IPDI | PPG | DMPA | none | CHDM | 55 | High |

*High = $M_W$ ranging from 25,000 to about 50,000
**Med = $M_W$ ranging from 10,000 to about 25,000

In an example of the first step of the method for making the anionic polyurethane acrylic hybrid polymer binder, components (a), (b), and (c) (with or without components (d) and (e) are mixed in a reactor with the organic solvent (e.g., dibutyl tin dilaulate and acetone). The reactor may be maintained at a constant temperature and under a dry inert gas. The components may be mixed and the polymerization reaction may be allowed to occur for some desirable time to form the polyurethane solution.

In an example of the second step of the method for making the anionic polyurethane acrylic hybrid polymer binder, the polyurethane solution may be added to water including a base slowly (e.g., over a 10 minute period) with agitation. The mixture may be stirred and organic solvent may be removed to form the polyurethane dispersion. In an example, the acid number of the polyurethane dispersion ranges from about 15 mg KOH/g solid resin to about 150 mg KOH/g solid resin, or from about 40 mg KOH/g solid resin to about 100 mg KOH/g solid resin.

The third step of the method for making the anionic polyurethane acrylic hybrid polymer binder involves the free radical emulsion polymerization of acrylic monomers in the presence of the anionic polyurethane dispersion. The anionic polyurethane dispersion acts as a seed or surfactant for the emulsion polymerization of the acrylic monomers. The final product is the hybrid of the polyurethane and an acrylic polymer or copolymer.

The acrylic polymer or copolymer may be referred to as a latex particle, which, as used herein, is defined as a discrete polymer particle that is capable of being encapsulated with polyurethane and dispersed in water. The glass transition temperature ($T_g$) of the acrylic polymer or copolymer ranges from about −30° C. to about 100° C. In some instances, it may be desirable that the $T_g$ of the acrylic polymer or copolymer be greater than 60° C. As such, the type and amount of the monomer(s) used to form the acrylic polymer or copolymer should be selected to form an acrylic polymer or copolymer having its $T_g$ within the given range.

Suitable acrylic monomers include acrylates, methacrylates, styrene, vinyl chloride, vinylacetate, butadiene, acrylamide and its derivatives, unsaturated acid containing monomers, and combinations thereof. Examples of acrylate monomers include methyl acrylate, ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, or the like. Examples of alkyl acrylates include methyl methacrylate, ethyl methacrylate, methoxymethyl acrylate, methoxyethyl acrylate, ethoxyethyl acrylate, butoxy ethyl acrylate, ethoxypropyl acrylate, or the like. Suitable derivatives include hydroxyethyl acrylate, hydroxypropyl acrylate, hydroxybutyl acrylate, or the like. Mixtures of two or more of the above monomers can also be utilized.

Unsaturated acid containing monomers that may be used include acrylic acid, methacrylic acid, itaconic acid, maleic acid, fumaric acid, 2-carboxyethyl acrylate, or the like. Half esters of the listed carboxylic acids may also be used as monomers, where the ester portion is an alkyl having from 1 to 10 carbon atoms. Specific examples include mono methyl maleate, mono methyl fumerate, mono methyl itaconate, or the like.

Several examples of the composition of the anionic polyurethane acrylic hybrid polymer binder (PUL) are shown in TABLE 2. The following abbreviations are used in TABLE 2: MMA (methyl methacrylate), BA (n-butyl acrylate), EA (ethyl acrylate), Sty (styrene), CHMA (cyclohexane methacrylate), t-BMA (t-butyl methacrylate), and Ed (ethylene diacrylate).

TABLE 2

| ID | Anionic PU (shell)* | Acrylic Latex (Core) | Acrylic Latex $T_g$ | PU/Acrylic Ratio |
|---|---|---|---|---|
| PUL-001 | PUD-1 | MMA/BA | 90 | 30/70 |
| PUL-002 | PUD-1 | MMA/BA | 90 | 30/70 |
| PUL-003 | PUD-1 | MMA/BA | 60 | 30/70 |
| PUL-004 | PUD-1 | MMA/BA | 90 | 15/85 |
| PUL-005 | PUD-1 | MMA/BA | 60 | 15/85 |
| PUL-006 | PUD-1 | EA/BA | −25 | 30/70 |
| PUL-007 | PUD-2 | MMA/BA | 90 | 30/70 |
| PUL-009 | PUD-3 | MMA/BA | 90 | 15/85 |

TABLE 2-continued

| ID | Anionic PU (shell)* | Acrylic Latex (Core) | Acrylic Latex $T_g$ | PU/Acrylic Ratio |
|---|---|---|---|---|
| PUL-010 | PUD-3 | Sty/BA | 90 | 15/85 |
| PUL-011 | PUD-3 | Sty/BA | 90 | 30/70 |
| PUL-012 | PUD-3 | MMA/BA | 71 | 30/70 |
| PUL-013 | PUD-3 | Sty/BA | 50 | 30/70 |
| PUL-014 | PUD-3 | MMA/BA | 50 | 30/70 |
| PUL-015 | PUD-3 | EA/BA | −25 | 30/70 |
| PUL-016 | PUD-3 | EA/BA | −28 | 30/70 |
| PUL-017 | PUD-5 | MMA/BA | 90 | 30/70 |
| PUL-018 | PUD-5 | EA/BA | −25 | 30/70 |
| PUL-019 | PUD-6 | MMA/BA | 90 | 30/70 |
| PUL-023 | PUD-11 | MMA/BA | 60 | 30/70 |
| PUL-026 | PUD-3 | Sty/BA/MAA | 90 | 30/70 |
| PUL-027 | PUD-10 | Sty/BA/MAA | 60 | 30/70 |
| PUL-030 | PUD-11 | MMA/BA | 90 | 30/70 |
| PUL-031 | PUD-6 | MMA/BA | 90 | 15/85 |
| PUL-032 | PUD-12 | MMA/BA | 90 | 30/70 |
| PUL-033 | PUD-13 | MMA/BA | 90 | 30/70 |
| PUL-034 | PUD-15 | MMA/BA | 90 | 30/70 |
| PUL-035 | PUD-12 | MMA/BA | 60 | 30/70 |
| PUL-036 | PUD-15 | MMA/BA | 60 | 30/70 |
| PUL-19 | PUD-6 | MMA/BA | 90 | 30/70 |
| PUL-037 | PUD-16 | MMA/BA | 90 | 30/70 |
| PUL-045 | PUD-1 | CHMA/BA | 80 | 30/70 |
| PUL-046 | PUD-1 | t-BMA/BA | 90 | 30/70 |
| PUL-047 | PUD-1 | MMA/BA/Ed | 90 | 30/70 |
| PUL-052 | PUD-3 | MMA/BA | 90 | 25/75 |
| PUL-054 | PUD-3 | MMA/BA | 90 | 20/80 |
| PUL-051 | PUD-21 | MMA/BA | 90 | 30/70 |
| PUL-059 | PUD-21 | MMA/BA | 60 | 30/70 |
| PUL-060 | PUD-21 | Sty/BA/MMA | 60 | 30/70 |
| PUL-061 | PUD-23 | MMA/BA | 90 | 30/70 |
| PUL-062 | PUD-23 | MMA/BA | 90 | 15/85 |
| PUL-070 | PUD-24 | MMA/BA | 90 | 15/85 |
| PUL-081 | PUD-31 | MMA/BA | 90 | 30/70 |
| PUL-083 | PUD-37 | MMA/BA | 90 | 20/80 |
| PUL-087 | PUD-39 | MMA/BA | 90 | 20/80 |
| PUL-088 | PUD-37 | MMA/BA | 50 | 20/80 |
| PUL-089 | PUD-44 | MMA/BA | 90 | 30/70 |
| PUL-091 | PUD-53 | MMA/BA | 90 | 30/70 |

*from TABLE 1

The anionic polyurethane acrylic hybrid polymer binder may be in the form of particles. The particle size may range from about 30 nm to about 200 nm.

Referring now to FIG. 1, the multiple-cartridge ink set disclosed herein is used in the printing method 10. The ink set in this example of the method 10 includes four different cartridges 12, 14, 14', and 16 containing, respectively, the pre-treatment fixing fluid 13, a first ink 15, a second ink 15', and the post-treatment fluid 17. In various implementations, the ink set may include any number of ink cartridges 14, 14' containing different inks 15, 15'.

It is to be understood that the ink set disclosed herein may be incorporated into various apparatuses or systems for inkjet printing, such as a thermal inkjet printer. The inkjet ink sets may also be suitable for use on many types of recording media 18, including, for example, plain paper, glossy media, porous media, non-porous media, offset media, cartons/packaging, etc.

When using the multiple-cartridge ink set disclosed herein to form an image on the medium 18 the printing method 10 involves, separately depositing onto the medium 10, in order, the pre-treatment fixing fluid 13, the ink 15, 15', and the post-treatment fluid 17. The pre-treatment fixing fluid 13, the ink 15, 15', and the post-treatment fluid 17 are jetted from their respective ink cartridges 12, 14, 14', 16.

In some examples, the post-treatment fluid 17 may be jetted after the pre-treatment fixing fluid 13 and the ink(s) 15, 15' have dried. It is to be understood that one or more drying operations, using dryer 22, may be performed after the pre-treatment fixing fluid 13 and the ink(s) 15, 15' have been jetted. The drying operation(s) may be performed at ambient temperature or under heat. For example, the drying operation may be performed at about 80° C., or in some examples, at about 100° C., or in still further examples, at 80° C. and then at 100° C.

In other examples, the post-treatment fluid 17 may be jetted while the ink(s) 15, 15' and the pre-treatment fixing fluid 13 are still wet (i.e., have not completely dried) on the medium 18. In this example, the dryer 22 may not be included in the printing system. Also in these examples, one or more drying operations may be performed after the pre-treatment fluid 13, the ink(s) 15, 15', and the post-treatment fluid 17 have been jetted on the medium 18. Dryer 20 may be used in this example, and the drying operation(s) may be similar to those previously described.

To further illustrate the present disclosure, examples are given herein. It is to be understood that these examples are provided for illustrative purposes and are not to be construed as limiting the scope of the disclosed example(s).

EXAMPLE 1

Synthesis of Polyurethane Acrylic Hybrid Polymers

Examples of the polyurethane acrylic hybrid polymers were prepared. In this Example, the formation of PUD-6, PUD-1, and PUD-16 (TABLE 1) and the formation of PUL-031, PUL-001, and PUL-037 (TABLE 2) are described in detail.

1a. Synthesis of PUD-6

PUD-6 was prepared in a 1 liter 4-neck round bottom flask. To this flask, 174.57 g of IPDI, 52.67 g of DMPA, 172.76 g of PTMG, 12 drops of dibutyl tin dilaulate, and 170 g of acetone were added. The reactor was immersed in a constant temperature bath. A condenser and mechanical stirrer were attached, and the system was under dry nitrogen. The temperature of the water bath was increased to 70° C. and the polymerization was continued for 16 hours to form a polyurethane solution.

44.06 g of 45% potassium hydroxide (KOH) was mixed with 1600 g of deionized water in a 4-liter beaker. The polyurethane solution was poured slowly to the KOH solution with agitation to form a polyurethane dispersion. The total addition time was about 10 minutes. The polyurethane dispersion was continued to stir for 30 minutes. Acetone was removed by a Rotor Evaporator with dry ice condenser. The dispersion was filtered through 400 mesh sieve and 30 μm filter paper. The total solid was about 20.75%. The weight average molecular weight was determined by GPC to be about 21,000.

1b. Synthesis of PUL-031

521.9 g of the polyurethane dispersion prepared in 1a (i.e., PUD-6), 12.72 g of 2-Acrylamido-2-methylpropane sulfonic acid (AMPS), 7.34 g of sodium persulfate, 18.4 g of sodium dodecyl sulfate, and 826.4 g of deionized water in a 4 liter beaker. The pH was adjusted to 8.5 with 1N NaOH. The solution was stirred with a mechanical stirrer and purged with a stream of nitrogen. Then, 576.8 g of methyl methacrylate and 36.8 g of n-butyl acrylate were added to the polyurethane dispersion with good agitation until a stable emulsion formed. The emulsion was purged with nitrogen continuously. A five neck round bottom reactor equipped with a mechanical stirrer and condenser was immersed in a constant temperature bath at 80° C. The emulsion of polyurethane and acrylic monomers was pumped to the reactor over two hours. The polymerization was continued for one hour after the addition of the polyurethane and monomer emulsion. Stable polyurethane acrylic hybrid particles with a fine particle size were formed. The product (i.e., PUL-031) was cooled to room temperature with cold water and filtered through a 400 mesh metal sieve. The % solid was 36.7 and the particle size was about 75.4 nm. The pH was about 8.09.

2a. Synthesis of PUD-1

PUD-1 was prepared in a 1 liter 4-neck round bottom flask. To this flask, 176.11 g of IPDI, 66.41 g of DMPA, 257.47 g of PTMG, 12 drops of dibutyl tin dilaulate, and 214 g of acetone were added. The reactor was immersed in a constant temperature bath. A condenser and mechanical stirrer were attached, and the system was under dry nitrogen. The temperature of the water bath was increased to 70° C. and the polymerization was continued for 16 hours to form a polyurethane solution.

55.5 g of 45% potassium hydroxide (KOH) was mixed with 1600 g of deionized water in a 4-liter beaker. The polyurethane solution was poured slowly to the KOH solution with agitation to form a polyurethane dispersion. The total addition time was about 10 minutes. The polyurethane dispersion was continued to stir for 30 minutes. Acetone was removed by a Rotor Evaporator with dry ice condenser. The dispersion was filtered through 400 mesh sieve and 30 μm filter paper. The total solid was about 21.27%. The weight average molecular weight was determined by GPC to be about 33,000.

2b. Synthesis of PUL-001

1570 g of the polyurethane dispersion prepared in 2a (i.e., PUD-1), 31.17 g of 2-Acrylamido-2-methylpropane sulfonic acid (AMPS), 11.29 g of sodium persulfate, and 608.36 g of deionized water in a 4 liter beaker. The pH was adjusted to 8.5 with 1N NaOH. The solution was stirred with a mechanical stirrer and purged with a stream of nitrogen. Then, 732.4 g of methyl methacrylate and 46.7 g of n-butyl acrylate were added to the polyurethane dispersion with good agitation until a stable emulsion formed. The emulsion was purged with nitrogen continuously. A five neck round bottom reactor equipped with a mechanical stirrer and condenser was immersed in a constant temperature bath at 80° C. The emulsion of polyurethane and acrylic monomers was pumped to the reactor over two hours. The polymerization was continued for one hour after the addition of the polyurethane and monomer emulsion. Stable polyurethane acrylic hybrid particles with a fine particle size were formed. The product (i.e., PUL-001) was cooled to room temperature with cold water and filtered through a 400 mesh metal sieve. The % solid was 36.7 and the particle size was about 65.4 nm. The pH was about 7.89.

3a. Synthesis of PUD-16

PUD-16 was prepared in a 1 liter 4-neck round bottom flask. To this flask, 208.0 g of IPDI, 65.75 g of DMPA, 200.53 g of PTMG, 25.68 g of 1,6-cyclohexane dimethylol (CHDM), 12 drops of dibutyl tin dilaulate, and 214 g of acetone were added. The reactor was immersed in a constant temperature bath. A condenser and mechanical stirrer were attached, and the system was under dry nitrogen. The temperature of the water bath was increased to 70° C. and the polymerization was continued for 16 hours to form a polyurethane solution.

55.5 g of 45% potassium hydroxide (KOH) was mixed with 1600 g of deionized water in a 4-liter beaker. The polyurethane solution was poured slowly to the KOH solution with agitation to form a polyurethane dispersion. The total addition time was about 10 minutes. The polyurethane dispersion was continued to stir for 30 minutes. Acetone was removed by a Rotor Evaporator with dry ice condenser. The dispersion was filtered through 400 mesh sieve and 30 μm filter paper. The total solid was about 20.46%. The weight average molecular weight was determined by GPC to be about 35,000.

3b. Synthesis of PUL-037

2176.2 g of the polyurethane dispersion prepared in 3a (i.e., PUD-16), 20.78 g of 2-Acrylamido-2-methylpropane sulfonic acid (AMPS), 15.05 g of sodium persulfate, and 749.0 g of deionized water in a 4 liter beaker. The pH was adjusted to 8.5 with 1N NaOH. The solution was stirred with a mechanical stirrer and purged with a stream of nitrogen. Then, 976.58 g of methyl methacrylate and 62.33 g of n-butyl acrylate were added to the polyurethane dispersion with good agitation until a stable emulsion formed. The emulsion was purged with nitrogen continuously. A five neck round bottom reactor equipped with a mechanical stirrer and condenser was immersed in a constant temperature bath at 80° C. The emulsion of polyurethane and acrylic monomers was pumped to the reactor over two hours. The polymerization was continued for one hour after the addition of the polyurethane and monomer emulsion. Stable polyurethane acrylic hybrid particles with a fine particle size were formed. The product (i.e., PUL-037) was cooled to room temperature with cold water and filtered through a 400 mesh metal sieve. The % solid was 36.3 and the particle size was about 62.0 nm. The pH was about 7.89.

EXAMPLE 2

A pre-treatment fixing fluid, an ink, three different post-treatment fluids according to examples disclosed herein, and a comparative post-treatment fluid were prepared. The post-treatment fluids were prepared using PUL-031, PUL-001, and PUL-037 as described above in Example 1. The formulations for each of the fluids are shown in the TABLES below.

TABLE 3

Pre-Treatment Fixing Fluid

| Compositional Components | Weight Percent (wt %) |
|---|---|
| Calcium Propionate | 6.5 |
| Calcium Pantothenate | 4.8 |
| SURFYNOL ® SE-F | 0.05 |
| Tetraethylene Glycol | 12.0 |
| Methanesulfonic Acid | Added to adjust pH to 6.6 |
| Biocide | 0.2 |
| Water | Balance |

TABLE 4

Ink

| Compositional Components | Weight Percent (wt %) |
|---|---|
| Carbon Black Pigment* | 3.0 |
| JONCRYL ® HPD 674 | 0.825 |
| 2-pyrrolidone | 3.0 |
| 2-hydroxyethyl-2-pyrrolidone | 6.0 |
| TEGO ® Wet 510 | 0.45 |
| CRODAFOS ® N-3 acid | 0.5 |
| DEXTRAN ® 500K | 0.01 |
| Biocide | 0.24 |
| Water | Balance |

*Pigment was present in a dispersion, but wt % reflects wt % of pigment

TABLE 5

Post-Treatment Fluids (PTF1-PTF3) and Comparative Post-Treatment Fluid (COMP PTF)

| Compositional Components | PTF1 (wt %) | PTF2 (wt %) | PTF3 (wt %) | COMP PTF (wt %) |
|---|---|---|---|---|
| Styrene/Acrylic Latex (acid no. <10, dispersed with anionic sulfate surfactant, Tg 106° C., particle size 220 nm) | None | None | None | 12 |
| Anionic Polyurethane Acrylic Hybrid Polymer Binder (PUL-037 from Example 1) | 12 | None | None | None |
| Anionic Polyurethane Acrylic Hybrid Polymer Binder (PUL-001 from Example 1) | None | 12 | None | None |
| Anionic Polyurethane Acrylic Hybrid Polymer Binder (PUL-031 from Example 1) | None | None | 12 | None |
| 2-hydroxyethyl-2-pyrrolidone | 1.5 | 1.5 | 1.5 | 7.5 |
| LEG-1 | 1 | 1 | 1 | 1 |
| DANTOCOL ™ DHE | 9 | 9 | 9 | 7.5 |
| UNITHOX ™ 480 | 0.5 | 0.5 | 0.5 | 1 |
| DOWFAX ™ 8390 | 0.2 | 0.2 | 0.2 | None |
| TEGO ® Wet 510 | 0.6 | 0.6 | 0.6 | 0.6 |
| SURFYNOL ® SE-F | 0.65 | 0.65 | 0.65 | 0.3 |
| CRODAFOS ® N-3 acid | 0.5 | 0.5 | 0.5 | 0.5 |
| LIQUILUBE ™ 405 | None | None | None | 1.5 |
| Biocide | 0.32 | 0.32 | 0.32 | 0.32 |
| Water | Balance | Balance | Balance | Balance |

Ink sets (Ink Set 1, Ink Set 2, Ink Set 3) and comparative ink sets (Comp Ink Set 1, Comp Ink Set 2) were prepared using the pre-treatment fixing fluid of TABLE 3, the ink of TABLE 4, and the post-treatment fluids of TABLE 5. The components of the ink sets and the comparative ink sets are shown in TABLE 6.

TABLE 6

Ink Sets

| Ink Set | Pre-treatment Fixing Fluid | Ink | Post-Treatment Fluid |
|---|---|---|---|
| Ink Set 1 | TABLE 3 | TABLE 4 | PTF1 |
| Ink Set 2 | TABLE 3 | TABLE 4 | PTF2 |
| Ink Set 3 | TABLE 3 | TABLE 4 | PTF3 |
| Comp Ink Set 1 | TABLE 3 | TABLE 4 | None |
| Comp Ink Set 2 | TABLE 3 | TABLE 4 | COMP PTF |

The example and comparative ink sets were printed on coated offset glossy media (i.e., STERLING® Ultra Gloss paper (NewPage Corp.)) under the same printing conditions. For the various prints, the amount of fixer printed was 2.5 gsm, the amount of ink printed was 10 gsm, and, when used, the amount of post-treatment fluid or comparative post-treatment fluid printed was 5 gsm. The prints were tested for durability performance and crusting.

For durability testing, Taber wet rub, Sutherland dry rub, and Taber dry rub tests were performed on the prints. The Taber wet rub was performed with a Taber® 5750 Linear Abraser using a water wet cloth to wipe the print one 2-minute cycle with 250 g force. The Sutherland dry rub was performed using a Sutherland Rub tester with a 4 lb weight for 20 cycles on the print. The Taber dry rub was performed with a Taber® eraser tip manually rubbed across the print one minute after printing. The ΔOD was measured using an X-rite 500 series Spectrodensitometer. These results are shown in TABLE 7.

TABLE 7

Rub Performance

| Ink Set | ΔOD (Taber Wet Rub) | ΔOD (Sutherland Dry Rub) | ΔOD (Taber Dry Rub) |
|---|---|---|---|
| Ink Set 1 | <0.20 | <0.05 | 0.1 |
| Ink Set 2 | <0.20 | <0.05 | <0.1 |
| Ink Set 3 | <0.20 | 0.22 | 0.26 |
| Comp Ink Set 1 | 0.95 | 0.25 | 0.55 |
| Comp Ink Set 2 | <0.20 | <0.05 | 0.35 |

These results illustrate that durability is better when the post-treatment fluids disclosed herein are used (compared to when no post-treatment fluid is used, i.e., comparing Ink Sets 1-3 with Comparative Ink Set 1), and also illustrates that the post-treatment fluids including an example of the anionic polyurethane acrylic hybrid polymer binder disclosed herein exhibit better Taber dry rub than and comparable Taber Wet Rub with a post-treatment fluid including an acrylic latex (i.e., comparing Ink Sets 1-3 with Comparative Ink Set 2).

The results in TABLE 7 also illustrate that the anionic polyurethane acrylic hybrid polymer binders (in the post-treatment fluids disclosed herein) are able to form a durable film quickly and upon being exposed to minimal heat. Fast printing speeds (from 400 ft/min to 600 ft/min) were used to form the prints in this example. These fast printing speeds involved relatively short dry times. The time for which each of the prints were exposed to heat for drying was less than 10 seconds. The durability results for Ink Sets 1, 2 and 3 indicate that the anionic polyurethane acrylic hybrid polymer binders are capable of quickly crosslinking the polymer chains (e.g., through hydrogen bonding), thus forming a durable film with less heat exposure. The Taber dry rub results for Comparative Ink Set 2 indicate that the short dry time, and thus less heat exposure, is not suitable for film formation when the post-treatment fluid including an acrylic latex alone.

Crusting is representative of nozzle health, and is measured by the length of time that the inkjet pen used to print the post-treatment fluid can continuously print without being serviced (e.g., wiped). Since Comparative Ink Set 1 did not include any post-treatment fluid, crusting was not measured for this comparative example. The crusting results for Ink Sets 1, 2, and 3 and Comparative Ink Set 2 are shown in TABLE 8.

TABLE 8

Crusting Performance

| Ink Set | Length of time pen is healthy |
|---|---|
| Ink Set 1 | >45 minutes |
| Ink Set 2 | <20 minutes |
| Ink Set 3 | 22 minutes |
| Comp Ink Set 2 | <20 minutes |

These results illustrate that pen reliability when depositing the post-treatment fluids including the anionic polyurethane acrylic hybrid polymer binders is better than or comparable with pen reliability when depositing the comparative post-treatment fluid including acrylic latex.

EXAMPLE 3

In this example, decap was tested using the post-treatment fluids PTF1, PTF2, and PTF3 from Example 2, another comparative post-treatment fluid (COMP PTF2) including polyurethane linear binder instead of the anionic polyurethane acrylic hybrid polymer binder, and a comparative ink (COMP INK) including an acrylic latex binder therein.

The comparative post-treatment fluid (COMP PTF2) was prepared similar to the example post-treatment fluids, except that a polyurethane linear binder was included in an amount of 5 wt % instead of the 12 wt % of anionic polyurethane acrylic hybrid polymer binder. The balance of water was adjusted accordingly.

The comparative ink (COMP INK) including an acrylic latex binder was prepared in accordance with the composition in TABLE 4, except that 5% of an acrylic latex binder was added. The balance of water was adjusted accordingly.

Each of the example post-treatment fluids PTF1, PTF2, PTF3, the comparative post-treatment fluid COMP PTF2, and the comparative ink COMP INK were tested for decap. Decap was performed on a "Conga" testbed that included print cartridge electronics to print thermal inkjet pens with a nominal drop weight of 12 ng. These pens were printed on a standard office paper loaded on a rotating drum (30 inches per second) with a pen frequency of 12 KHz and pen temp of 55° C. Pens were printed at discreet and increasing time intervals of up to 10 seconds. Between each print time interval, the pen was kept idle and uncapped. Decap is reported as # of spits (drops) required to attain a healthy (drop wt and location) normal drop on paper. The decap results are shown in TABLE 9.

TABLE 9

Decap Performance at 1 second

| | # spits to recover nozzle health |
|---|---|
| PTF1 | 22 |
| PTF2 | 35 |
| PTF3 | 15 |
| COMP PTF2 | >50 |
| COMP INK | >50 |

The results shown in TABLE 9 clearly illustrate that the decap performance of the post-treatment fluids PTF1, PTF2, PTF3 including the anionic polyurethane acrylic hybrid polymer binders is greatly improved compared to both post-treatment fluids including linear polyurethane binders (COMP PTF2) as well as inks that include acrylic latex binder therein (COMP INK).

It is believed that the ink sets disclosed herein may enable a reduced total amount of fluid to be dispensed to form a print. This is due, at least in part, to the use of the anionic polyurethane acrylic hybrid polymer binder and its capability of forming a durable film on the print quickly and at reduced dry times. Enhanced film forming properties require less fluid to be used. Lower total fluid laydown leads to lower cost per page, potentially less wrinkling or cockling of the medium, and less heat needed to drive off water in the respective fluids.

It is to be understood that the ranges provided herein include the stated range and any value or sub-range within the stated range. For example, a range from greater than 0 wt % to about 25 wt % should be interpreted to include not only the explicitly recited limits of greater than 0 wt % to about 25 wt %, but also to include individual values, such as 0.05 wt %, 0.9 wt %, 7 wt %, 21 wt %, etc., and sub-ranges, such as from about 1 wt % to about 24 wt %, from about 5 wt % to about 20 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A thermal inkjet ink set, comprising:
   a pre-treatment fixing fluid including a metal salt;
   an ink including an ink vehicle and a colorant; and
   a post-treatment fluid, which is devoid of colorant, including
   a fluid vehicle and
   an anionic polyurethane acrylic hybrid polymer binder dispersed in the fluid vehicle, the anionic polyurethane acrylic hybrid polymer binder present in an amount ranging from greater than 0.05 wt % to about 25 wt %, and the anionic polyurethane acrylic hybrid polymer binder is a particle having a core shell morphology including:
   an acrylic polymer or copolymer forming a core of the particle; and
   an anionic polyurethane polymer forming a shell of the particle and encapsulating the acrylic polymer or copolymer,
   wherein the anionic polyurethane polymer includes:
   a polyisocyanate segment which is isophorone diisocyanate;
   a polyol segment having a number average molecular weight ranging from about 500 to about 6,000 and is selected from the group consisting of polytetrahydrofuran, polypropyleneglycol, polycarbonate polyol, a mixture of polytetrahydrofuran and monodicarbinol terminated polydimethylsiloxane, and a mixture of polytetrahydrofuran and carbinol (hydroxyl) terminated polydimethylsiloxane;
   a compound including i) an ionic group or ii) a group to form an ionic group is selected from the group consisting of 2,2'-dimethyloyl propionic acid, taurine, and mixtures thereof;
   optionally a diol or triol having a number average molecular weight ranging from about 62 to about 500 and is selected from the group consisting of cyclohexane dimethyol, a mixture of cyclohexane dimethyol and hydroxyethyl acrylate, and 3-methyl-1,5-pentanediol; and
   optionally a second polyol segment which is polyethyleneoxide diol.

2. The thermal inkjet ink set as defined in claim 1 wherein the polyurethane acrylic hybrid polymer binder includes at least 70 wt % of the acrylic polymer or copolymer and 30 wt % or less of the anionic polyurethane polymer.

3. The thermal inkjet ink set as defined in claim 1 wherein the acrylic polymer or copolymer is selected from the group consisting of a copolymer of methyl methacrylate and n-butyl acrylate, a copolymer of ethyl acrylate and n-butyl acrylate, a copolymer of styrene and n-butyl acrylate, a copolymer of styrene, n-butyl acrylate, and methyl methacrylate, a copolymer of cyclohexane methacrylate and n-butyl acrylate, a copolymer of t-butyl methacrylate and n-butyl acrylate, and a copolymer of methyl methacrylate, n-butyl acrylate, and ethylene diacrylate.

4. The thermal inkjet ink set as defined in claim 1 wherein a Tg of the acrylic polymer or copolymer ranges from about −30° C. to about 100° C.

5. The thermal inkjet ink set as defined in claim 1 wherein each of the treatment fixing fluid, the ink, and post-treatment fluid are contained in separate ink cartridges.

6. The thermal inkjet ink set as defined in claim 1 wherein the anionic polyurethane polymer has a molecular weight ranging from about 5,000 to about 70,000.

7. The thermal inkjet ink set as defined in claim 1 wherein the fluid vehicle consists of:
   a co-solvent selected from the group consisting of Di-(2-Hydroxyethyl)-5,5-Dimethylhydantoin, N-(2-Hydroxyethyl)-2-pyrrolidone, hydroxyethyl urea, 1,2,6- hexanetriol, 1,2,4-butanetriol, tetraethylene glycol, 2-methyl-2-hydroxymethyl-1,3-propandiol, and combinations thereof;

a surfactant;

optionally an additive selected from the group consisting of an anti-kogation agent, a wax, a biocide, and combinations thereof; and a balance of water.

8. The thermal inkjet ink set as defined in claim 1 wherein the colorant of the ink is an anionically dispersed pigment.

9. A printing method, comprising:

separately depositing onto a medium, in order with a thermal inkjet printer, a pre-treatment fixing fluid, an ink, and a post-treatment fluid, which is devoid of colorant, including a fluid vehicle and an anionic polyurethane acrylic hybrid polymer binder dispersed in the fluid vehicle, the anionic polyurethane acrylic hybrid polymer binder present in an amount ranging from greater than 0.05 wt % to about 25 wt %, and the anionic polyurethane acrylic hybrid polymer binder is a particle having a core shell morphology including:

an acrylic polymer or copolymer forming a core of the particle; and an anionic polyurethane polymer forming a shell of the particle and encapsulating the acrylic polymer or copolymer, wherein the anionic polyurethane polymer includes:

a polyisocyanate segment which is isophorone diisocyanate;

a polyol segment having a number average molecular weight ranging from about 500 to about 6,000 and is selected from the group consisting of polytetrahydrofuran, polypropyleneglycol, polycarbonate polyol, a mixture of polytetrahydrofuran and monodicarbinol terminated polydimethylsiloxane, and a mixture of polytetrahydrofuran and carbinol (hydroxyl) terminated polydimethylsiloxane;

a compound including i) an ionic group or ii) a group to form an ionic group is selected from the group consisting of 2,2'-dimethyloyl propionic acid, taurine, and mixtures thereof;

optionally a diol or triol having a number average molecular weight ranging from about 62 to about 500 and is selected from the group consisting of cyclohexane dimethyol, a mixture of cyclohexane dimethyol and hydroxyethyl acrylate, and 3-methyl-1,5-pentanediol; and optionally a second polyol segment which is polyethyleneoxide diol.

10. The printing method as defined in claim 9, further comprising performing a drying operation after the depositing of the ink and before the depositing of the post-treatment fluid.

11. The printing method as defined in claim 9 wherein the depositing of the post-treatment fluid is performed before the ink and the pre-treatment fixing fluid are dry.

12. The printing method as defined in claim 9 wherein:

the depositing of the pre-treatment fixing fluid includes jetting the pre-treatment fixing fluid from a first inkjet ink cartridge;

the depositing of the ink includes jetting the ink from a second inkjet ink cartridge; and the depositing of the post-treatment fluid includes jetting the post-treatment from a third inkjet ink cartridge.

* * * * *